United States Patent [19]
Niemi et al.

[11] 3,785,001
[45] Jan. 15, 1974

[54] BOWLING LANE FINISH APPLICATOR

[75] Inventors: Arvi E. Niemi; John R. Marecek, both of Muskegon, Mich.

[73] Assignee: Brunswick Corporation, Skokie, Ill.

[22] Filed: Mar. 27, 1972

[21] Appl. No.: 238,298

[52] U.S. Cl. .................................. 15/245, 118/108
[51] Int. Cl. ............................................ B05c 11/04
[58] Field of Search ............. 15/245, 98, 4, 256.51, 15/256.5, 102, 210 R; 118/123, 126, 108

[56] References Cited
UNITED STATES PATENTS
3,340,559 9/1967 Klose ................................ 15/210 R
3,683,851 8/1972 Nolden ............................... 118/126
FOREIGN PATENTS OR APPLICATIONS
504,083 4/1939 Great Britain ....................... 15/245
800,570 11/1950 Germany ............................ 15/245

Primary Examiner—Leon G. Machlin
Attorney—William G. Lawler, Jr., Sheldon L. Epstein and Donald S. Olexa

[57] ABSTRACT

The invention is a device for applying high viscosity finishes upon bowling lanes. A rubber billiard cushion used as the applicator blade is mounted to a flexible acrylic plate backed by a heavy layer of resilient plastic or rubber foam. The mounting plate and its resilient backing ride freely within an inverted "U"-shaped channel member. Downward pressure on the blade is maintained by weight placed on top of the channel member and distributed through the resilient layer of foam.

7 Claims, 4 Drawing Figures

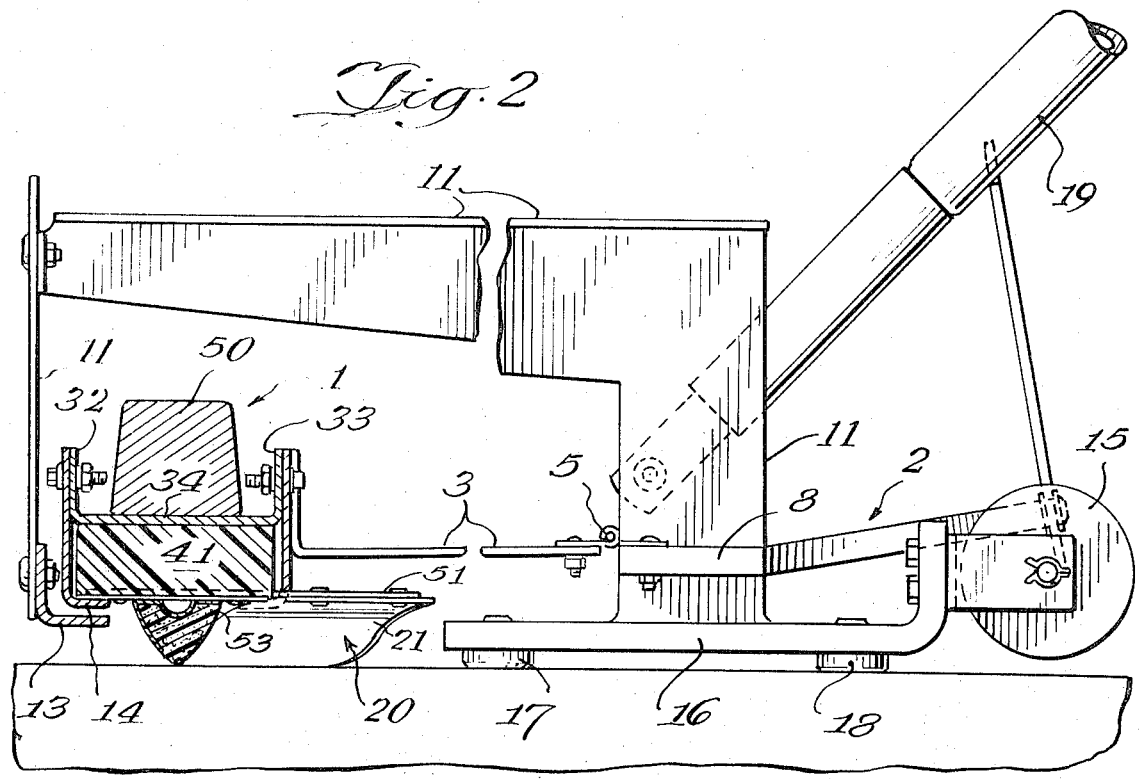
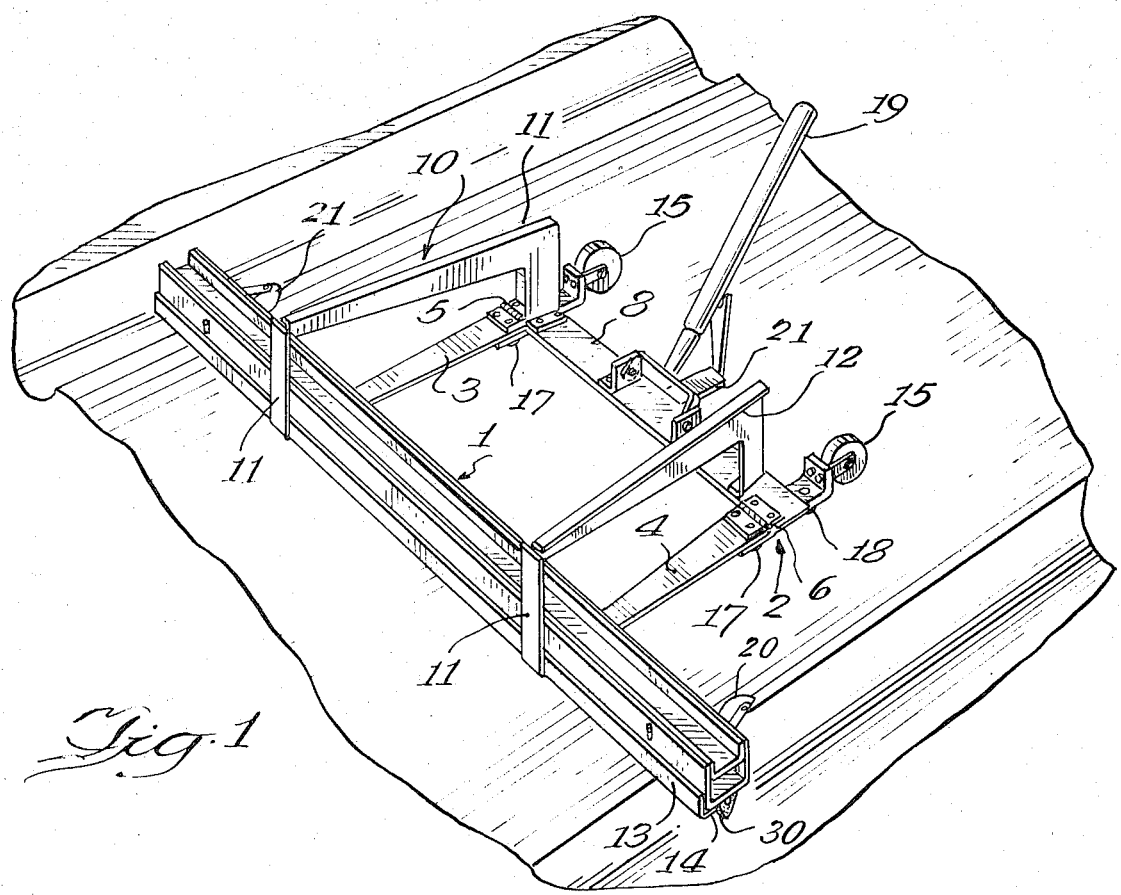

BOWLING LANE FINISH APPLICATOR

BACKGROUND

The invention is in the field of finish applicators and is more specifically directed to a device for applying highly viscous finishes to bowling lanes. One such finish is a two component polyurethane polymer consisting essentially of 100 percent solids and sold by the assignee under the trade name ASTROLANE 100. The finish includes a base coat and a top coat described in U. S. Pat. application Ser. No. 168,409, Schultz, "Polyurethane Coating Composition with 100 percent Solids," and Ser. No. 168,409, Stein et al., "Polyurethane Coating Composition with 100 percent Solids," the subject matter of which is hereby incorporated herein by this reference. These applications are jointly owned by the assignee of this application. Basically these finishes comprise a mixture of polyols or polyesters activated by a diisocyanate functional prepolymer. The reaction of the diisocyanate and the polyesters may be symbolized as follows.

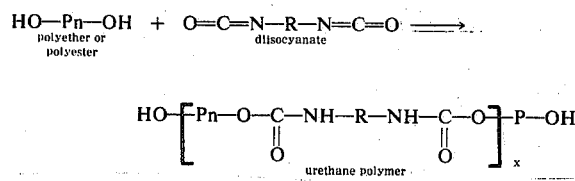

The catalyst is added to the top and base coats to promote cure of each within three to five hours, so that a lane can be coated, buffed, conditioned and ready for play within 12 hours after the application of the finish. This tme criteria permits the operator of a bowling establishment to resurface without closing his establishment. In reducing the cure time, the working time or pot life of the mixtures was sacrificed. When the pot life of the finish is exceeded it increases in viscosity very rapidly to the point where it can no longer be spread; thus the finish must be mixed, applied and the applicator cleaned before the pot life has elapsed. In the case of the ASTROLANE 100 finish the relationship between pot life and temperature of the base coat and top coat is as follows.

| Temperature (°F) | Basecoat Pot Life in minutes | Topcoat Pot Life in minutes |
|---|---|---|
| 65 | 9 | 14 |
| 75 | 7 | 11 |
| 85 | 5 | 8 |

Two other properties of the 100 percent solids finishes make their application difficult. First, their viscosity is high (1,000 to 2,000 cps) compared to that of the older lacquer finishes which had a viscosity of less than 200 cps; and second, the fact that they do not shrink as lacquer finishes do. Lacquer finishes, being about 85 percent solvent by weight, shrink as the solvent evaporates and this shrinking serves to erase surface blemishes and roughness. By contrast, the volume of the ASTROLANE type finishes does not change during drying as there is no evaporation of solvent. Lastly, moisture in the air reacts vigorously with the diisocyanate activator in accordance with the following formula, releasing carbon dioxide bubbles into the material. $OC-N-R-NCO + 2H_2O \rightarrow H_2N-R-NH_2 + 2CO_2 \uparrow$ All of these characteristics combine to make application of such a finish difficult.

Because of the short pot life and lack of shrinkage, the material must be applied smoothly in one pass of the applicator. Also, it has been found that the film thickness must be 3.5 mils or less in order to permit the carbon dioxide bubbles to escape from the surface before the finish cures. If the film is too thick, the foaming caused by the carbon dioxide will cause hazy, low gloss areas in the finish and a rough surface which not only collects dirt but has a different coefficient of friction which affects the action of the bowling ball. Furthermore, tests have shown that a thick, hard finish such as lacquer applied directly to the lane surface does not effectively distribute impact of the bowling ball and thus accelerates lane decay through feathering, cracking, chip-outs, etc. A three to four mil layer of the ASTROLANE type protective base coating has been found to provide the lane with a soft, elastic finish which gives the wood good protection and doesn't foam when properly applied as taught herein. It is the primary objective of the invention to provide an applicator capable of satisfactorily applying a high viscosity, non-shrinking, short pot life finish, such as that described above.

It is a further objective of the invention to provide such an applicator at minimum weight.

Prior to the conception of the invention, the number of devices fashioned according to the prior art were tried and the results were unsatisfactory. Some of these are taught in the following prior art.

| U.S. Pat. No. | INVENTOR(S) |
|---|---|
| 2,438,354 | Unterbrink |
| 2,547,223 | Lombardo |
| 2,727,266 | Smith et al. |
| 2,760,219 | Boeriu |
| 2,763,019 | Huber |
| 3,097,385 | Unterbrink |
| 3,240,184 | LeMieux et al. |
| 3,319,600 | Regan |

The first attempt using a steel draw-down bar resulted in a non-uniform film having both dry areas and high spots. A mohair lacquer applicator would not spread the finish due to its high viscosity, and a window squeegie offered no control over the thickness of the film. At this point it was decided that the finish could not be applied using conventional applicator designs, and more imaginative approaches were taken. For example, some success was achieved using a weighted length of three-quarter inch channel iron wrapped with mohair, and with this success came the relaization that thickness of the film had to be uniform and carefully controlled in order to avoid the aforementioned blemishes caused by the entrapped $CO^2$ bubbles. In another attempt a wooden board wrapped with rubber foam, Mylar film, then nylon organdy was pulled on edge to apply the finish. The structure was clumsy and difficult to clean and required a total of 82 pounds in weight to obtain a workable film thickness.

Later the idea of using a rubber billiard cushion as the drawblade was conceived. Orginally the cushion was mounted on a plywood backing; however, the backing was soon changed to ⅛-inch tempered masonite to obtain greater conformity of the blade to the lane. Also to increase flexibility, the board was fastened to the frame at just two points and weights in the form of tube-like canvas bags filled with lead shot laid on top of the board to control film thickness. While some success was achieved with this design there were a significant number of failures. In most cases the defective lanes had heavy streaks, usually with foaming, in line with the points where the board attached to the frame. It was concluded that this resulted from the fact that the board was restricted in motion or immobilized at the points where it was attached to the frame, so the film thickness was reduced in these locations by the addition of small weights at such points of attachment and a shimming down of the board. However, another problem which plagued this configuration was twisting of the backing board during the drawing process. Finally the applicator head of the assembly of the invention was conceived as a means for completely separating the action of the board and its attached billiard cushion blade from the applicator frame and carriage.

SUMMARY

Basically the invention comprises a self-supporting carriage and means for moving the carriage over the surface to be coated. An applicator head assembly is attached to the carriage by means which permit freedom of movement along its vertical axis. The applicator head which is the heart of the invention includes a housing adapted to receive weights thereupon, an applicator blade extending below and riding freely within said housing and means for retaining the blade in position within the housing, including a resilient body positioned between the top of the blade and those portions of the housing which bear downwardly upon it.

Deflector panels of flexible material mounted adjacent to the applicator blade angle downwardly and inwardly to control the bounds of a pool of finish which moves ahead of and is to be applied as the applicator is drawn over the surface.

Another advantage of the invention is the manner in which the pool of finish in front of the applicator is controlled by its end deflectors. As the deflectors are flexible and downwardly and inwardly aligned, finish material pushed ahead by the applicator blade rides up and over the deflectors urging them downwardly upon the surface being coated, while the finish material is itself deflected inwardly to maintain the outer limits of the pool.

Another advantage of the invention accruing from the fact that weight is applied to the blade through a resilient barrier is that weights applied to the blade may be rigid in lieu of flexible.

A further advantage of the invention is that it allows the use of a thinner more flexible backing board for the blade which increases the flexibility of the assembly. Such thin backing boards could not be used with prior art applicators where they were rigidly attached to a drag frame as they were found to twist and catch at the ends when pulling a finish.

The most novel characteristic of the invention and that felt to be responsible for its success is the resilient coupling of the blade to the applicator housing achieved primarily through a layer of sponge rubber or plastic. As will appear from the following description, there is no rigid connection between the blade and the housing.

The primary advantage of the structure of the applicator head of the assembly lies in the equal distribution of weight to the applicator blade achieved by the elastic linkage between the housing and the blade, which linkage permits the blade to adjust to both high and low variations in the surface being coated so as to avoid material variations in the coating thickness.

Other objectives, advantages and various further features of movelty and invention will be pointed out or will occur to those skilled in the art from a reading of the following specification in conjunction with the accompanying drawings.

BRIEF DESCRIPTION OF THE DRAWINGS

FIG. 1 is a perspective view of an applicator of the invention.

FIG. 2 is a cross sectional view of the applicator of FIG. 1.

DETAILED DESCRIPTION OF THE PREFERRED EMBODIMENT

Figure 3:
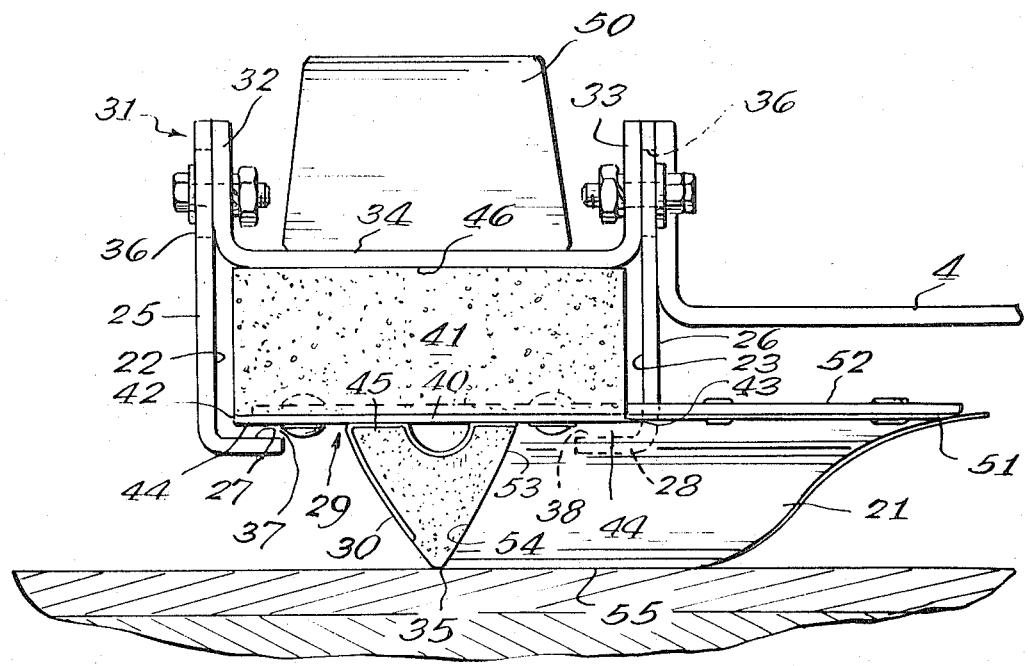
FIG. 3 is an end view of the applicator head assembly of the applicator of FIG. 1.

Referring now to FIG. 1, the head assembly 1 is attached to a self-supporting draw carriage 2 by two horizontal draw arms 3 and 4. Arms 3 and 4 are attached to the draw carriage 2 by hinges 5 and 6 which permit vertical motion of the arms 3 and 4 separately about a horizontal axis of the carriage structure.

A prime member of the carriage structure is a horizontal element 8 to which the draw arms 3 and 4 and other structure is attached. A head support assembly 10 provides support for the head assembly 1 when the carriage is being moved into position or from one location to another. The head support assembly 10 includes two support arms 11 and 12, rigidly affixed to the carriage frame 8, which extend out, over and down behind the head assembly 1. A horizontal support bar 13 is attached to the arms 11 and 12 and extends under the trailing edge 14 of the head assembly 1. The horizontal bar 13 is rigidly attached to the carriage frame and is so positioned that it will not interfere with the movement of the head assembly 1 in the process of application. Its purpose is to provide support for the head 1 when the draw carriage is tilted back onto the casters 15 when the applicator is moved other than by sliding along the surface.

The draw carriage 2 is supported by two "L"-shaped legs 16 which ride on a pair of Teflon plastic buttons 17 and 18 as best seen in FIG. 2.

A handle 19 pivotally attached to the frame 8 of the carriage may be used to draw the assembly along the surface being coated.

As is common with applicators of this general type, a puddle of material to be distributed by the applicator is maintained in front of it. To control this puddle deflector paddles 20 and 21 are positioned at preselected end points adjacent the blade and define the width of the area covered by a single draw of the applicator.

Referring now to FIG. 2, the carriage 2, including the frame member 8, the head support arms 11 and 12 and horizontal support bar 13 comprise a rigid assembly which rests solidly upon the "L"-shaped legs 16 and their Teflon plastic glide buttons 17 and 18. The draw arm 3 is pivotally joined by a hinge 5 to the frame member 8 of the carriage, and is thus free to make up and down adjustments within the more than adequate bounds permitted by the head support structure 11-13.

It is anticipated however that most vertical variations in the surface will be absorbed within the applicator head assembly 1 described below. It is evident from FIG. 2 that when the carriage 2 is tilted back onto the casters 15, the horizontal support bar 13 will engage the trailing portion 14 of the head assembly 1 preferably along its entire length to prevent twisting, and support it above the floor during movement.

Referring to FIGS. 1, 2 and 3 the head assembly 1 includes a housing 31, the two sides of which are preferably formed by aluminum angle extrusions 25 and 26 having portions 27 and 28, respectively, which are inturned but set apart so as to form a slot 29 in the bottom of the housing 31. The side elements 25 and 26 of the housing are held together by being bolted to the upright sides 32 and 22 of an aluminum channel extrusion 34 by means of such as bolts 35. Elongated bolt holes 36 and the sides 25 and 26 aid by permitting exact alignment of the housing elements.

In the embodiment of the invention illustrated, the applicator blade 30 illustrated is a billiard cushion made of rubber with a resiliency on the "A" Durometer scale of 35 to 45. While softer cushions tried were more flexible, the nose 35 flattened out more causing it to leave a thicker finish for a given amount of weight. It was found advantageous to use a harder cushion as proper film thickness could be achieved with lesser weight—one of the objects of the invention.

While the overall dimensions of the blade 30 are those of a billiard cushion, the radius of the nose 35 of the cushion which comprises the applicator blade edge was found to have a critical effect upon the thickness of the film applied for a given weight per unit length of the applicator. Increasing the nose radius increases the cushion area in contact of the finish resulting in an increase in film thickness per unit weight, while decreasing the radius has the opposite effect. It was further found that thickness of the film applied was more sensitive to pull speed and finish velocity with a larger radius edge, but that the smaller the radius, the more sensitive the film thickness to changes in weight. A nose with a radius of 1/16-inch upon a cushion having a Durometer reading of 35 to 45 has been found to be most advantageous.

The billiard cushion blade 30 is mounted upon a base board 40 of thin flexible material. A base board made of 1/16-inch Plexiglas has been found to be most advantageous as it is stiff enough to prevent the blade from twisting within the assembly described herein and yet flexible enough to permit desirable vertical variations called for by undulations in the surface being coated. Use of a stiff unbending board would largely negate the weight distributing function of the layer of resilient material 41 to be described. The base board 40 is wide enough so that the outer edges 42 and 43 fall adjacent but sufficiently apart from the inner walls 22 and 23 of the housing 31 so as not to bind upon vertical movement of the blade and its base 40. The bottom surfaces 44 of the board 40 which extend beyond the base 45 of the cushion 30, ride in contact with the inner faces 37 and 38 of the bottom portions 27 and 28 of the housing 31 when the blafe 30 is not engaged; the entire base board 40 being retained in this position by a 1 inch thick layer of compressible plastic or rubber foam. A foam having a density of one pound per cubic foot and a compressibility such that a foot square piece 4 inches thick is compressed 25 percent by a 16 to 21 pound load has been found to be most satisfactory. The layer of plastic foam 41 is retained in place by the bottom 46 of the channel element 34. The operational compressibility of the foam layer 41 can be adjusted by positioning the channel element 34 between the side members 25 and 26 so as to precompress the foam layer 41 as may be found desirable to influence the action of the blade. A suitable alternative to the foam may be an inflatable bladder, the internal pressure of which may be varied as desired.

A rigid bar shaped weight 50 is positioned on top of and within the channel in element 34. This weight is transferred evenly through the foam layer 41 to the blade 30. As the blade and its backing 40 are not attached rigidly at any point to the draw carriage 2 or the head housing 31, the weight is distributed and applied to the blade edge 35 solely through the resilient foam layer 41. The combination of the elasticity and shape of the billiard cushion blade 30, the foam layer 41 and the thin plexiglass backing 40 for the blade has proved to have the unique characteristics of flexibility demanded for application of a high viscosity non-shrinking material such as that previously described.

Figure 4:
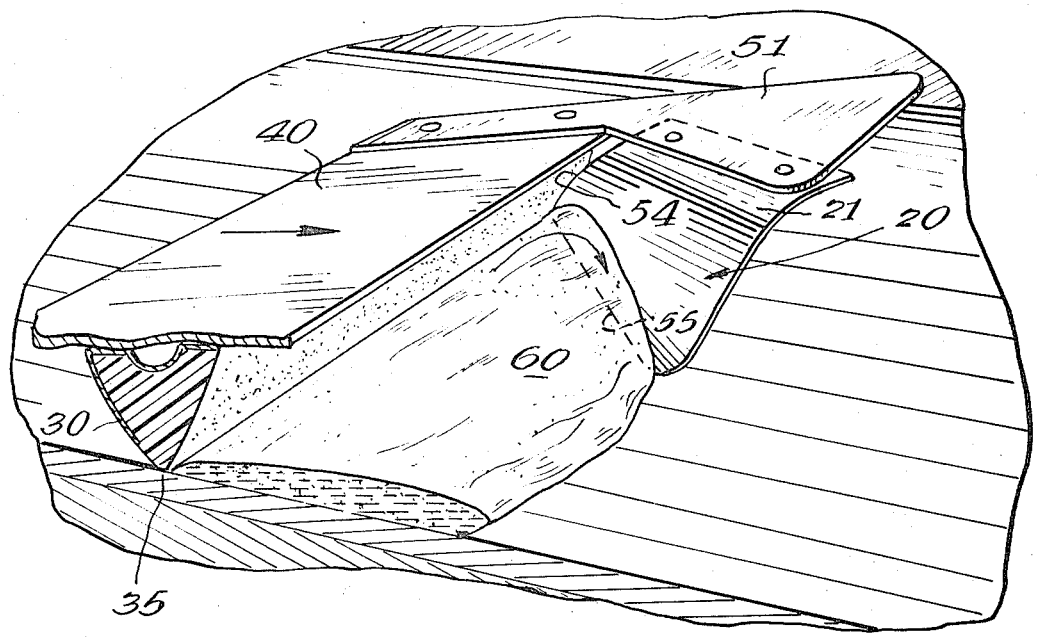
FIG. 4 is a perspective view of the assembly of an applicator blade and deflector paddle of the invention taken generally in the direction as indicated by the arrow 4 on FIG. 1.

Referring now to FIGS. 3 and 4, deflectors 20 and 21 are retained in position by paddle shaped arms 51 and 52 attached directly to the top surface of the Plexiglas plastic base board 40. The deflectors 21 and 22 are made from thin curved sheets of polyethelene or similarly resilient material. From their position affixed to the paddle arms 51 and 52 the deflectors 20 and 21 curve convexly down to the surface being coated. The inside edge 54 of the deflector is sculptured to lie immediately adjacent the front side 53 of the spreader blade 30. The deflectors are mounted so that their bottom edges 55 will be displaced upwardly upon contact with the surface being finished, resulting in a downward bias which tends to prevent passage of the liquid finish material therebeneath.

It is common practice when spreading finish material to pour a puddle of the material in front of the applicator blade 30, and it is the function of the deflectors 20 and 21 to prevent this material from escaping to either side thereof. As illustrated in FIG. 4, the material 60 building up in front of the blade 30 will tend to flow outwardly and up on to the inside of the deflector 21. The weight of this material, plus the bias created by displacing the deflector against its natural curvature, both act to keep the deflectors firmly in contact with the surface being coated. In addition, the deflectors 21 and 22 angle inwardly toward the center of the applicator so that the material 60 flowing outwardly and up onto the deflectors will be dispatched toward the center of the blade as it is advanced, thus keeping the puddle under control.

While the principles of the invention have been described in connection with the above specific apparatus, it is to be clearly understood that this description is made only by way of example and not as a limitation to the scope of the invention.

We claim:

1. A device for applying a layer of viscous material to a substantially flat surface, comprising:
   an applicator head comprising a blade extending downwardly therefrom for spreading the viscous material upon the surface, said blade being mounted on a flexible backing plate and having a nose with a radius of one-sixteenth inch upon a cushion having a Durometer reading of 35 to 45 on the Durometer "A" scale, carriage means for moving said head and said blade across the flat surface, and means for connecting said head to said carriage means, said applicator head further comprising, a substantially horizontal member and means for applying weight thereto, a resilient body disposed between said horizontal member and said blade, and means for maintaining said resilient body and said blade in working alignment beneath said horizontal member.

2. The device of claim 1 wherein said retaining means comprises, a plurality of elements depending downwardly from said horizontal member adjacent but spaced from the sides of said resilient material.

3. The device of claim 2 wherein said head assembly comprises, a spreader blade having a lower edge and a top portion, a flexible backing plate attached to the top portion of the blade and disposed adjacent the bottom surface of said resilient body, whereby weight applied to said horizontal member is applied to said spreader blade through said resilient body and said flexible backing plate.

4. The device of claim 3 wherein said resilient body comprises a layer of plastic or rubber foam.

5. The device of claim 1 wherein said flexible backing plate is:

a layer of rigid but flexible material having substantially the same lateral dimensions as said resilient body.

6. The device of claim 5 further including means disposed at each end of the blade for deflecting a pool of finish toward the center thereof comprising, flexible plates having one side adjacent said blade and a bottom edge in contact with the surface being finished, means for attaching said plates to said backing so that said plates are flexed upwardly when the applicator is placed upon the surface to be coated.

7. The device of claim 4 wherein the foam has a density of one pound per cubic foot and a compressibility such that a foot square piece 4 inches thick is compressed 25 percent by a 16 to 21 pound load.

* * * * *